US010068391B2

(12) United States Patent
Morgan et al.

(10) Patent No.: US 10,068,391 B2
(45) Date of Patent: *Sep. 4, 2018

(54) ON BOARD MONITORING DEVICE

(71) Applicant: **GORDON*HOWARD ASSOCIATES, INC.**, Littleton, CO (US)

(72) Inventors: Gerald A. Morgan, Littleton, CO (US); Christopher M. Macheca, Centennial, CO (US); Franco Chirico, Highlands Ranch, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,228

(22) Filed: May 26, 2017

(65) Prior Publication Data
US 2017/0294055 A1    Oct. 12, 2017

Related U.S. Application Data

(63) Continuation of application No. 14/993,139, filed on Jan. 12, 2016, now Pat. No. 9,701,279.

(51) Int. Cl.
*B60R 25/10* (2013.01)
*G07C 5/00* (2006.01)
(Continued)

(52) U.S. Cl.
CPC ............. *G07C 5/008* (2013.01); *G08G 1/207* (2013.01); *B60R 25/04* (2013.01); *B60R 25/1012* (2013.01)

(58) Field of Classification Search
CPC .......... G07C 5/008; G07C 2009/00293; G07C 2009/00531; G08G 1/207; B60R 25/04;
(Continued)

(56) References Cited

U.S. PATENT DOCUMENTS 4,335,370 A    6/1982 Scalley et al.
4,592,443 A    6/1986 Simon
(Continued)

FOREIGN PATENT DOCUMENTS

EP          1557807         7/2005
KR    10-2004-0073816      8/2004
(Continued)

OTHER PUBLICATIONS

US 5,699,633, 10/1999, Roser (withdrawn)
(Continued)

*Primary Examiner* — Anh V La
(74) *Attorney, Agent, or Firm* — Conley Rose, PC (57) ABSTRACT

An onboard device comprising a processor, a memory coupled to the processor, and an analog-to-digital (A/D) converter. The onboard device also comprises a transceiver and a global positioning system (GPS) receiver. In some embodiments, the memory of the onboard device stores a program that, when executed causes the processor to monitor voltage levels of a main battery of a vehicle for presence of a start sequence of a vehicle, detect movement of the vehicle, and send a message to an operations center indicating movement of the vehicle without occurrence of the start sequence.

20 Claims, 5 Drawing Sheets

(51) Int. Cl.
*G08G 1/00* (2006.01)
*B60R 25/04* (2013.01)

(58) Field of Classification Search
CPC . B60R 25/1012; B60R 25/00; B60R 25/1018; B60R 25/20; B60R 25/1004; B60K 28/063; B60K 2350/355
USPC ............ 340/425.5, 426.1, 428, 429, 426.19, 340/426.3, 426.11
See application file for complete search history.

(56) References Cited

U.S. PATENT DOCUMENTS

| | | | |
|---|---|---|---|
| 4,624,578 A | 11/1986 | Green | |
| 4,688,026 A | 8/1987 | Scribner et al. | |
| 4,700,296 A | 10/1987 | Palmer, Jr. et al. | |
| 4,736,294 A | 4/1988 | Gill et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,359,528 A | 10/1994 | Haendel et al. | |
| 5,426,415 A | 6/1995 | Prachar et al. | |
| 5,490,200 A | 2/1996 | Snyder et al. | |
| 5,495,531 A | 2/1996 | Smiedt | |
| 5,510,780 A | 4/1996 | Norris et al. | |
| 5,619,573 A | 4/1997 | Brinkmeyer et al. | |
| 5,673,318 A | 9/1997 | Bellare et al. | |
| 5,708,712 A | 1/1998 | Brinkmeyer et al. | |
| 5,775,290 A | 7/1998 | Staerzi et al. | |
| 5,797,134 A | 8/1998 | McMillan et al. | |
| 5,818,725 A | 10/1998 | McNamara et al. | |
| 5,819,869 A | 10/1998 | Horton | |
| 5,857,024 A | 1/1999 | Nishino | |
| 5,898,391 A | 4/1999 | Jefferies et al. | |
| 5,917,405 A | 6/1999 | Joao | |
| 5,928,291 A | 7/1999 | Jenkins et al. | |
| 5,940,812 A | 8/1999 | Tengel et al. | |
| 5,969,633 A | 10/1999 | Rosier | |
| 5,970,143 A | 10/1999 | Schneier et al. | |
| 5,970,481 A | 10/1999 | Westerlage | |
| 6,025,774 A | 2/2000 | Forbes | |
| 6,026,922 A | 2/2000 | Horton | |
| 6,032,258 A | 2/2000 | Godoroja et al. | |
| 6,064,970 A | 5/2000 | McMillan et al. | |
| 6,064,971 A | 5/2000 | McMillan et al. | |
| 6,088,143 A | 7/2000 | Bang | |
| 6,088,799 A | 7/2000 | Morgan et al. | |
| 6,130,621 A | 10/2000 | Weiss | |
| 6,157,317 A | 12/2000 | Walker | |
| 6,185,307 B1 | 2/2001 | Johnson, Jr. | |
| 6,195,648 B1 | 2/2001 | Simon et al. | |
| 6,225,890 B1 | 5/2001 | Murphy | |
| 6,232,874 B1 | 5/2001 | Murphy | |
| 6,233,566 B1 | 5/2001 | Levine et al. | |
| 6,249,217 B1 | 6/2001 | Forbes | |
| 6,249,227 B1 | 6/2001 | Brady et al. | |
| 6,278,936 B1 | 8/2001 | Jones | |
| 6,353,776 B1 | 3/2002 | Rohrl et al. | |
| 6,370,649 B1 | 4/2002 | Angelo et al. | |
| 6,380,848 B1 | 4/2002 | Weigl et al. | |
| 6,401,204 B1 | 6/2002 | Euchner et al. | |
| 6,429,773 B1 | 8/2002 | Schuyler | |
| 6,489,897 B2 | 12/2002 | Simon | |
| 6,587,739 B1 | 7/2003 | Abrams et al. | |
| 6,601,175 B1 | 7/2003 | Arnold et al. | |
| 6,611,201 B1 | 8/2003 | Bishop et al. | |
| 6,611,686 B1 | 8/2003 | Smith et al. | |
| 6,615,186 B1 | 9/2003 | Kolls | |
| 6,665,613 B2 | 12/2003 | Duvall | |
| 6,691,232 B1 | 2/2004 | Wood et al. | |
| 6,693,517 B2 | 2/2004 | McCarthy et al. | |
| 6,714,859 B2 | 3/2004 | Jones | |
| 6,717,527 B2 | 4/2004 | Simon | |
| 6,741,927 B2 | 5/2004 | Jones | |
| 6,804,606 B2 | 10/2004 | Jones | |
| 6,812,829 B1 | 11/2004 | Flick | |
| 6,816,089 B2 | 11/2004 | Flick | |
| 6,816,090 B2 | 11/2004 | Teckchandani et al. | |
| 6,828,692 B2 | 12/2004 | Simon | |
| 6,868,386 B1 | 3/2005 | Henderson et al. | |
| 6,870,467 B2 | 3/2005 | Simon | |
| 6,873,824 B2 | 3/2005 | Flick | |
| 6,888,495 B2 | 5/2005 | Flick | |
| 6,917,853 B2 | 7/2005 | Chirnomas | |
| 6,924,750 B2 | 8/2005 | Flick | |
| 6,950,807 B2 | 9/2005 | Brock | |
| 6,952,645 B1 | 10/2005 | Jones | |
| 6,961,001 B1 | 11/2005 | Chang et al. | |
| 6,972,667 B2 | 12/2005 | Flick | |
| 6,985,583 B1 | 1/2006 | Brainard et al. | |
| 6,993,658 B1 | 1/2006 | Engberg et al. | |
| 7,005,960 B2 | 2/2006 | Flick | |
| 7,015,830 B2 | 3/2006 | Flick | |
| 7,020,798 B2 | 3/2006 | Meng et al. | |
| 7,031,826 B2 | 4/2006 | Flick | |
| 7,031,835 B2 | 4/2006 | Flick | |
| 7,039,811 B2 | 5/2006 | Ito | |
| 7,053,823 B2 | 5/2006 | Cervinka et al. | |
| 7,061,137 B2 | 6/2006 | Flick | |
| 7,091,822 B2 | 8/2006 | Flick et al. | |
| 7,103,368 B2 | 9/2006 | Teshima | |
| 7,123,128 B2 | 10/2006 | Mullet et al. | |
| 7,124,088 B2 | 10/2006 | Bauer et al. | |
| 7,133,685 B2 | 11/2006 | Hose et al. | |
| 7,142,089 B2 | 11/2006 | Yamagishi | |
| 7,149,623 B2 | 12/2006 | Flick | |
| 7,205,679 B2 | 4/2007 | Flick | |
| 7,224,083 B2 | 5/2007 | Flick | |
| 7,228,417 B2 | 6/2007 | Roskind | |
| 7,266,507 B2 | 9/2007 | Simon et al. | |
| 7,292,152 B2 | 11/2007 | Torkkola et al. | |
| 7,299,890 B2 | 11/2007 | Mobley | |
| 7,310,618 B2 | 12/2007 | Libman | |
| 7,323,982 B2 | 1/2008 | Staton et al. | |
| 7,327,250 B2 | 2/2008 | Harvey | |
| 7,379,805 B2 | 5/2008 | Olsen, III et al. | |
| 7,389,916 B2 | 6/2008 | Chirnomas | |
| 7,427,924 B2 | 9/2008 | Ferrone et al. | |
| 7,542,921 B1 | 6/2009 | Hildreth | |
| 7,561,102 B2 | 7/2009 | Duvall | |
| 7,814,005 B2 | 10/2010 | Imrey et al. | |
| 7,818,254 B1 | 10/2010 | Ma | |
| 7,823,681 B2 | 11/2010 | Crespo et al. | |
| 7,873,455 B2 | 1/2011 | Arshad et al. | |
| 7,877,269 B2 | 1/2011 | Bauer et al. | |
| 7,904,332 B1 | 3/2011 | Merkley | |
| 7,930,211 B2 | 4/2011 | Crolley | |
| 8,018,329 B2 | 9/2011 | Morgan et al. | |
| 8,086,523 B1 | 12/2011 | Palmer | |
| 8,095,394 B2 | 1/2012 | Nowak et al. | |
| 8,140,358 B1 | 3/2012 | Ling et al. | |
| 8,217,772 B2 | 7/2012 | Morgan et al. | |
| 8,325,025 B2 | 12/2012 | Morgan et al. | |
| 8,344,894 B2 | 1/2013 | Szczerba et al. | |
| 8,370,027 B2 | 2/2013 | Pettersson et al. | |
| 8,370,925 B2 | 2/2013 | Childress et al. | |
| 8,510,556 B2 | 8/2013 | Cao et al. | |
| 8,630,768 B2 | 1/2014 | McClellan et al. | |
| 8,754,751 B1 | 6/2014 | Piccoli | |
| 8,841,987 B1 | 9/2014 | Stanfield et al. | |
| 8,653,956 B2 | 12/2014 | Berkobin et al. | |
| 9,002,536 B2 | 4/2015 | Hatton | |
| 9,378,480 B2 | 6/2016 | Morgan et al. | |
| 9,701,279 B1 * | 7/2017 | Morgan | B60R 25/102 |
| 2001/0034577 A1 | 10/2001 | Grounds et al. | |
| 2001/0040503 A1 | 11/2001 | Bishop | |
| 2002/0019055 A1 | 2/2002 | Brown | |
| 2002/0091473 A1 | 7/2002 | Gardner et al. | |
| 2002/0120371 A1 | 8/2002 | Levian et al. | |
| 2002/0120374 A1 | 8/2002 | Douros | |
| 2002/0193926 A1 | 12/2002 | Katagishi et al. | |
| 2003/0036823 A1 | 2/2003 | Mahvi | |

(56) References Cited

U.S. PATENT DOCUMENTS

| | | |
|---|---|---|
| 2003/0095046 A1 | 5/2003 | Borugian |
| 2003/0101120 A1 | 5/2003 | Tilton |
| 2003/0151501 A1 | 8/2003 | Teckchandani et al. |
| 2003/0191583 A1 | 10/2003 | Uhlmann et al. |
| 2003/0231550 A1 | 12/2003 | McFarlane |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0024203 A1 | 2/2005 | Wolfe |
| 2005/0030184 A1 | 2/2005 | Victor |
| 2005/0033483 A1 | 2/2005 | Simon et al. |
| 2005/0128080 A1 | 6/2005 | Hall et al. |
| 2005/0134438 A1 | 6/2005 | Simon |
| 2005/0162016 A1 | 7/2005 | Simon |
| 2005/0200453 A1 | 9/2005 | Turner et al. |
| 2005/0231323 A1 | 10/2005 | Underdahl et al. |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 | 1/2007 | Haave et al. |
| 2007/0038351 A1 | 2/2007 | Larschan et al. |
| 2007/0082614 A1 | 4/2007 | Mock |
| 2007/0139189 A1 | 6/2007 | Helmig |
| 2007/0146146 A1 | 6/2007 | Kopf et al. |
| 2007/0176771 A1 | 8/2007 | Doyle |
| 2007/0179692 A1 | 8/2007 | Smith et al. |
| 2007/0185728 A1 | 8/2007 | Schwarz et al. |
| 2007/0194881 A1 | 8/2007 | Schwarz et al. |
| 2007/0222588 A1 | 9/2007 | Wolfe |
| 2007/0224939 A1 | 9/2007 | Jung et al. |
| 2007/0285207 A1 | 12/2007 | Bates |
| 2007/0288271 A1 | 12/2007 | Klinkhammer |
| 2007/0299567 A1 | 12/2007 | Simon et al. |
| 2008/0042814 A1 | 2/2008 | Hurwitz et al. |
| 2008/0109378 A1 | 5/2008 | Papadimitriou |
| 2008/0114541 A1 | 5/2008 | Shintani et al. |
| 2008/0150683 A1 | 6/2008 | Mikan et al. |
| 2008/0162034 A1 | 7/2008 | Breen |
| 2008/0221743 A1 | 9/2008 | Schwarz et al. |
| 2008/0223646 A1 | 9/2008 | White |
| 2008/0231446 A1 | 9/2008 | Cresto |
| 2008/0243558 A1 | 10/2008 | Gupte |
| 2008/0245598 A1 | 10/2008 | Gratz et al. |
| 2008/0255722 A1 | 10/2008 | McClellan et al. |
| 2008/0294302 A1 | 11/2008 | Basir |
| 2009/0043409 A1 | 2/2009 | Ota |
| 2009/0051510 A1 | 2/2009 | Follmer et al. |
| 2009/0182216 A1 | 7/2009 | Roushey, III et al. |
| 2009/0234770 A1 | 9/2009 | Simon |
| 2009/0237249 A1 | 9/2009 | Bielas |
| 2009/0248222 A1 | 10/2009 | McGarry et al. |
| 2009/0284359 A1 | 11/2009 | Huang et al. |
| 2009/0284367 A1 | 11/2009 | Pfafman et al. |
| 2009/0295537 A1 | 12/2009 | Lane et al. |
| 2010/0030586 A1 | 2/2010 | Taylor et al. |
| 2010/0045452 A1 | 2/2010 | Periwai |
| 2010/0063850 A1 | 3/2010 | Daniel |
| 2010/0075655 A1 | 3/2010 | Howarter et al. |
| 2010/0090826 A1 | 4/2010 | Moran et al. |
| 2010/0148947 A1 | 6/2010 | Morgan et al. |
| 2010/0238009 A1 | 9/2010 | Cook et al. |
| 2010/0268402 A1 | 10/2010 | Schwarz et al. |
| 2010/0312691 A1 | 12/2010 | Johnson, Jr. |
| 2011/0040630 A1 | 2/2011 | Weiss |
| 2011/0050407 A1 | 3/2011 | Schoenfeld et al. |
| 2011/0057800 A1 | 3/2011 | Sofer |
| 2011/0084820 A1 | 4/2011 | Walter et al. |
| 2011/0148626 A1 | 6/2011 | Acevedo |
| 2011/0153143 A1 | 6/2011 | O'Neil et al. |
| 2011/0210867 A1 | 9/2011 | Benedikt |
| 2011/0270779 A1 | 11/2011 | Showalter |
| 2012/0066011 A1 | 3/2012 | Ichien et al. |
| 2012/0068858 A1 | 3/2012 | Fredkin |
| 2012/0068886 A1 | 3/2012 | Torres |
| 2012/0089423 A1 | 4/2012 | Tamir et al. |
| 2012/0098678 A1 | 4/2012 | Rathmacher et al. |
| 2012/0158356 A1 | 6/2012 | Prochaska et al. |
| 2012/0203441 A1 | 8/2012 | Higgins et al. |
| 2012/0212353 A1 | 8/2012 | Fung et al. |
| 2012/0221216 A1 | 8/2012 | Chauncey et al. |
| 2013/0018677 A1 | 1/2013 | Chevrette |
| 2013/0074107 A1 | 3/2013 | Hyde et al. |
| 2013/0074111 A1 | 3/2013 | Hyde et al. |
| 2013/0074112 A1 | 3/2013 | Hyde et al. |
| 2013/0074115 A1 | 3/2013 | Hyde et al. |
| 2013/0099892 A1 | 4/2013 | Tucker et al. |
| 2013/0127617 A1 | 5/2013 | Baade et al. |
| 2013/0138460 A1 | 5/2013 | Schumann et al. |
| 2013/0141252 A1 | 6/2013 | Ricci |
| 2013/0144460 A1 | 6/2013 | Ricci |
| 2013/0144461 A1 | 6/2013 | Ricci |
| 2013/0144469 A1 | 6/2013 | Ricci |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0204455 A1 | 8/2013 | Chia et al. |
| 2013/0214917 A1* | 8/2013 | Chung .................. B60R 25/102 340/426.19 |
| 2013/0133389 A1 | 12/2013 | Weiss |
| 2014/0191858 A1 | 7/2014 | Morgan et al. |
| 2014/0225724 A1 | 8/2014 | Rankin et al. |
| 2014/0358896 A1 | 12/2014 | Camacho et al. |
| 2016/0090923 A1 | 3/2016 | Al Salah |
| 2016/0294198 A1* | 10/2016 | Poulis .................. H01M 10/441 |

FOREIGN PATENT DOCUMENTS

| | | |
|---|---|---|
| WO | 9616845 | 6/1996 |
| WO | 2007092272 | 8/2007 |
| WO | 2007092287 | 8/2007 |
| WO | 2010/068438 A2 | 6/2010 |
| WO | 2010062899 | 6/2010 |
| WO | 2012/097441 A1 | 7/2012 |

OTHER PUBLICATIONS

On Time Payment Protection Systems, printed Jan. 2, 2004 from www.ontime-pps.com/how.html, 2 pages.
Aircept Products, printed Jan. 2, 2004 from www. aircept. com/products.html, 1 page.
How PayTeck Works, printed Jan. 2, 2004 from www. payteck.cc/aboutpayteck.html, 1 page.
Article: "Pager Lets You Locate Your Car, Unlock and Start It", published Dec. 10, 1997 in USA Today, 1 page.
Article: "Electronic Keys Keep Tabs on Late Payers", published Sep. 22, 1997 in Nonprime Auto News, 1 page.
Article: "PASSTEC Device Safely Prevents Vehicles from Starting", published Jul. 19, 1999 in Used Car News, 1 page.
Payment Clock Disabler advertisement, published, May 18, 1998, 1 page.
Secure Your Credit & Secure Your Investment (Pay Teck advertisement), printed Jan. 2, 2004 from www. payteck.cc, 1 page.
IMetrik Company Information, printed Dec. 21, 2006 from imetrik.com, 1 page.
About C-CHIP Technologies, printed Dec. 21, 2006 from www.c-chip.com, 1 page.
Hi-Tech tools to solve traditional problems, printed Dec. 21, 2006 from www.c-chip.com, 1 page.

(56) References Cited

OTHER PUBLICATIONS

C-CHIP Technologies Products: Credit Chip 100, Credit Chip 100C, Credit Chip 200, printed Dec. 21, 2006 from www. c-chip.com, 1 page.
The Credit Chip 100, printed Dec. 21, 2006 from www.c-chip.com.
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.
Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).
De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011. San Diego, CA.
Credit Chip 200G Series and The Credit Chip 200G Series, C-Chip Technologies Corp., date unknown.
C-Chip Technologies User Guide, C-Chip Technologies Corp., date unknown.

* cited by examiner

ON BOARD MONITORING DEVICE

CROSS-REFERENCE TO RELATED APPLICATIONS

This application is a continuation of U.S. application Ser. No. 14/993,139, filed on Jan. 12, 2016, the disclosure of which is hereby incorporated by reference in its entirety.

BACKGROUND

Various devices may be affixed in a vehicle for lot management purposes, such as in the case of a dealership, as well as to track the vehicle and detect unauthorized towing of a vehicle. Such devices may be installed by a car dealer or an entity, such as the owner of the vehicle, interested in monitoring the vehicle. In the case of a dealership that has installed an onboard device, the cost of the onboard device may be passed on to the owner of the vehicle. As consumers are appreciative of cost reductions in various articles of manufacture especially when the cost reductions are passed along to the consumer, reducing manufacturing costs of the onboard device is beneficial.

BRIEF DESCRIPTION OF THE DRAWINGS

For a detailed description of exemplary embodiments of the invention, reference will now be made to the accompanying drawings in which.

DEFINITIONS

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct connection or through an indirect connection via other devices and connections.

"Affixed" with respect to a device and a vehicle shall mean that the device is mechanically and electrically coupled to the vehicle such that the device is not physically accessible by an occupant properly seated in the vehicle.

"Remote" or "remotely," relative to a device or vehicle, shall mean a distance of greater than one kilometer.

"Port" with respect to a device or circuit shall mean an electrical connection to the device or circuit on which electrical signals are received by the device or circuit, or on which electrical signals are sent by the device or circuit.

"Running state" in relation to a vehicle shall mean a state of operation of the vehicle in which an internal combustion engine of the vehicle is running and a battery of the vehicle is being charged.

"Disable" or "disabling" in relation to a vehicle shall mean inactivating a system of the vehicle (e.g., starter circuitry of the vehicle, fuel injection, spark ignition system), such that an operator of the vehicle is unable to start the vehicle.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to the technological field of asset tracking. More particularly, the various embodiments are directed to improvements to devices and systems that enable asset (e.g., vehicle) tracking and disablement. Related-art systems that track location of and possibly disable vehicles rely on access to the vehicle's ignition wire—that is, the wire within the system that conveys the command for the starter of the vehicle to turn the internal combustion engine as part of the overall starting procedure. Such related-art systems thus not only require electrical coupling to the vehicle's main battery for purposes of drawing operation power, but also require the installer of the device to locate, cut, and splice into the vehicle's ignition wire. Moreover, the related-art systems themselves thus require mechanisms to monitor the Boolean state of the signal on the vehicle's ignition wire, and also have additional wiring to enable the installer to make the splice into the vehicle's ignition wire. The hardware associated with monitoring the Boolean state of the vehicle's ignition wire adds cost and complexity to the related-art systems. Moreover, locating and splicing into the vehicle's ignition wire leads to complexity in the installation process, not to mention extra time, and the potential to damage other systems in the vehicle during the installation.

The various embodiments discussed here address, at least in part, the issues noted with the respect to the related-art devices by monitoring for presence of a start sequence of an internal combustion engine of a vehicle without the use of a connection to an ignition wire of the vehicle. More particularly, in various example embodiments monitoring for presence of a start sequence involves sampling the voltage of the main battery.

Bypassing the use of an ignition wire but retaining the ability to monitor for the presence of the start sequence of the internal combustion engine reduces the cost of manufacturing the onboard device as it does not utilize circuitry and wiring corresponding to a connection to the ignition wire. Reducing the number of wires and circuitry needed in an onboard device reduces the overall cost of the onboard device. In many cases the cost of the onboard device is borne by the consumer purchasing a vehicle that has an onboard device affixed within. By installing an onboard device that costs less, the cost savings may be passed on to the consumer such that the overall cost to purchase the vehicle is reduced. Moreover, installation of a system that does not require splicing into the vehicle's ignition wire reduces the time and complexity associated with installation, again reducing overall cost of acquiring and installing such systems. While the incremental reduced cost of each device, and installation of each device, may be relatively small, for large scale operations (e.g., car dealers having hundreds of cars and using such devices for lot management), the savings can be substantial.

Figure 1:
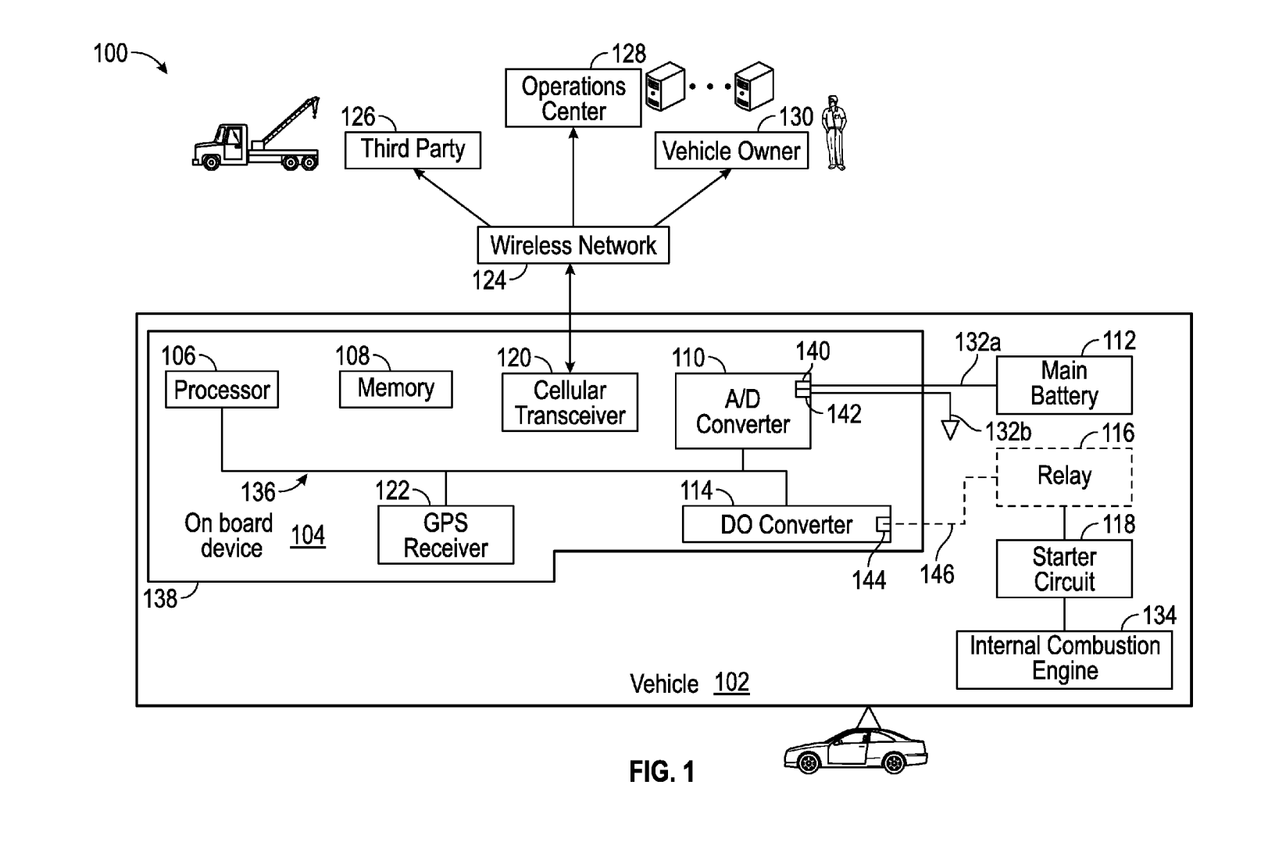
FIG. 1 shows a system with an onboard device in accordance with at least some embodiments.

FIG. 1 shows a system 100 with an onboard device in accordance with at least some embodiments. In particular, system 100 comprises vehicle 102, wireless network 124, third party 126, operations center 128, and vehicle owner 130. Each will be discussed in turn.

Third party 126, operations center 128, and vehicle owner 130 are individually coupled to wireless network 124. Vehicle 102 is coupled to wireless network 124 as well, by way of an onboard device 104 affixed within vehicle 102. Thus, vehicle 102 may communicate with third party 126 and/or operations center 128 and/or vehicle owner 130 by way of wireless network 124. The vehicle owner 130 may be the ultimate retail purchaser, but may also be the dealership prior to the car being sold. The third party 126 may be any interested third party, such as a lender who has financed purchase of the vehicle (e.g., either by the dealership or the ultimate retail purchaser), or a manufacturer who consigns vehicles to a dealership for sale.

Onboard device 104 may be affixed to a vehicle. In some cases, the onboard device 104 may be affixed within a vehicle compartment, such as a passenger compartment of vehicle 102. In some cases, onboard device 104 may reside under or within the dashboard of the vehicle, in a location not physically accessible by an occupant properly seated in the vehicle. Onboard device 104 may be located within any suitable compartment of vehicle 102, such as in an electrical compartment under the hood, or within the luggage compartment.

Onboard device 104 may be configured to perform various tasks such as coupling vehicle 102 to wireless network 124, providing location information of vehicle 102, detecting unauthorized towing of vehicle 102, and sending a notification regarding unauthorized tow detection of vehicle 102 (discussed more below). Onboard device 104 may be configured to send a notification to one or more of the groups comprising: third party 126, operations center 128, and vehicle owner 130.

In some embodiments, onboard device 104 may be configured to send or receive a notification or message by way of cellular transceiver 120. In onboard device 104, cellular transceiver 120 is coupled to processor 106 by way of bus 136. Thus, programs executing on processor 106 may access the cellular transceiver 120 over the bus 136, and send and receive messages through the cellular transceiver 120. Cellular transceiver 120 may implement a wireless communication system and/or protocol (i.e., radio frequency communication by way of electromagnetic waves propagating through air). Any suitable communication protocol may be implemented by the cellular transceiver 120, such as Global System for Mobile Communications (GSM) compliant protocol, a General Packet Radio Service (GPRS) compliant protocol, a Personal Communications Service (PCS) compliant system, and the like.

Onboard device 104 may further comprise processor 106 coupled to memory 108 by way of bus 136. Memory 108 stores programs executed by processor 106, and in some cases may be the working memory for processor 106. For example, the memory 108 may be random access memory (RAM) (e.g., dynamic random access memory (DRAM), flash memory), programmable read-only memory (PROM), or combinations. Memory 108 shall be considered a non-transitory computer-readable storage medium. While FIG. 1 depicts the processor 106 and memory 108 as separate components, in other cases processor 106 and memory 108 are an integrated component, such as a microcontroller.

The programs stored by memory 108 may comprise programs to implement various processes on the onboard device 104. For example, a program may cause processor 106 to receive a location of vehicle 102 and determine whether vehicle 102 is within an approved geo-boundary. In some embodiments, various programs may cause processor 106 to detect unauthorized towing of vehicle 102 and send messages to an operations center 128 indicating a location of vehicle 102 or that unauthorized towing of vehicle 102 has been detected.

In some embodiments, onboard device 104 may detect unauthorized towing of vehicle 102 by monitoring main battery 112 of vehicle 102. By monitoring the voltage of main battery 112, onboard device 104 may detect whether movement of vehicle 102 has occurred without a proper startup sequence of vehicle 102 (and without monitoring a Boolean start signal carried on the vehicle's ignition wire).

In a particular embodiment, onboard device 104 electrically couples to main battery 112 by way of wires 132a and 132b (referred to as pair of wires 132). The pair of wires 132 may extend through an exterior case 138 of onboard device 104. The pair of wires 132 may couple the onboard device 104 to the main battery 112 and reference voltage (e.g., negative terminal 204 of main battery 112). In other embodiments, the onboard device may mechanically and electrically couple to vehicle 102 by way of a connector that electrically couples to other components of the vehicle 102 such as main battery 112.

Main battery 112 may be a rechargeable battery that powers or supplies electric energy to various component of vehicle 102, such as lights, starter circuit 118 and internal combustion engine 134. Main battery 112 may be coupled to starter circuit 118, while starter circuit 118 is coupled to internal combustion engine 134 (discussed more below in reference to FIG. 2).

In various embodiments, the pair of wires 132 may couple voltage of main battery 112 to analog to digital (A/D) converter 110 of onboard device 104. Wire 132a may couple to analog input port 140 and wire 132b may couple to a reference voltage (e.g., the negative terminal of main battery 112). A/D converter 110 is coupled to bus 136 and may receive signals in the form of an analog signal representing a detected voltage of main battery 112. Thus, the processor 106, executing a program, may read from the A/D converter 110 a stream of digital values representative of analog voltage of the main battery 112 over time. For example, the voltage of main battery 112 will go through a start sequence comprising various voltage levels during a proper start of the vehicle 102. Onboard device 104 may monitor the voltage of main battery 112 for an expected start sequence to determine whether vehicle 102 has been started properly (discussed more with respect to FIG. 3 below).

Onboard device 104 may also monitor for movement of vehicle 102. If an expected start sequence is lacking, yet movement of vehicle 102 is detected by onboard device 104, onboard device 104 infers that movement of vehicle 102 is occurring during a time when vehicle 102 is not running, or the vehicle has not been started. That is, onboard device 104 may conclude that vehicle 102 is not running but moving, nonetheless. This might occur, in one example, when vehicle 102 is being towed.

Onboard device 104 may determine whether vehicle 102 is moving by way of Global Positioning System (GPS) receiver 122 or a similar location engine that calculates a geographical location by receiving information from one or more satellites. GPS receiver 122 is coupled to bus 136 of onboard device 138. In various embodiments, GPS receiver 122 may receive signals from one or more satellites orbiting the earth via an antenna that is tuned to the frequencies transmitted by the one or more satellites. GPS 122 may analyze the received signals to create location data indicative of a current location of vehicle 102. Thus, the processor 106, executing a program, may read from the GPS receiver 122 digital values indicative of current location of the onboard device 104 (and thus location of the vehicle 102).

In other embodiments, determining location is not limited to just data indicative of current location from the GPS receiver 122. For example, the processor 106, executing a program, may be in communication with several different cell towers by way of the cellular transceiver 120. By performing triangulation procedures, the processor 106 may determine that the onboard device 104 (and thus the vehicle 102) is moving even without receiving data indicative of current location from the GPS receiver 122. In yet still other cases, an initial determination may be made with one system (e.g., triangulation using the cellular transceiver 120), and then the initial determination verified with a second system (e.g., GPS receiver 122). In yet still other cases, onboard device 104 may detect nearby Wi-Fi access points or other communication nodes and reference a database that stores geographical locations of the detected Wi-Fi access points or other communication nodes. Based on the information of the geographical locations of the detected Wi-Fi access points or other communication nodes, the processor 106 may infer a location of the vehicle 102. In alternative embodiments, a motion sensor or an accelerometer may be used to determine if vehicle 102 is moving.

In some instances, onboard device 104 may receive a message, for example, from operations center 128 to disable or enable vehicle 102. Onboard device 104 may enable or disable vehicle 102 by way of digital output (DO) converter 114. DO converter 114 is coupled to bus 136 of onboard device 104. Thus, the processor 106, executing a program, may receive a message from the operations center 128 with a command to disable the vehicle. The processor 106 then communicates with the DO converter 114 across the bus 136 to assert a digital output of the DO converter 114.

In the example system, the DO converter 114 couples to relay 116 by way of wire 146 coupled to a digital output port 144 of DO converter 114. The relay 116 is coupled to starter circuit 118 of vehicle 102. Relay 116 may be configured to disable or enable components within starter circuit 118 based on signals sent to the relay 116 by way of DO converter 114. For example, asserting digital output port 144 on DO converter 114, coupled to wire 146, may disable vehicle 102. In alternative embodiments, asserting a digital output port 144 on DO converter 114, coupled to wire 146, may enable vehicle 102.

In some embodiments, onboard device 104 or alternatively operations center 128 may be configured to detect tampering of the system. For example, in one case, the onboard device 104 may receive a command to disable the vehicle and assert digital output port 144 accordingly. If onboard device 104 detects a start sequence of vehicle 102 subsequent to asserting the digital output port 144 (disabling the vehicle), then onboard device 104 may determine that the system has been tampered with. In some embodiments, onboard device 104 may determine that the system has been tampered with based on a combination of detected movement of vehicle 102 in conjunction with a detected start sequence of vehicle 102.

Tampering of the system might occur, for instance, if an individual alters relay 116 or onboard device 104 by changing components or configurations of the devices. The system may also be tampered with if an individual alters connections between the relay 116 and starter circuit 118 or alters connections between onboard device 104 and relay 116. In some embodiments, operations center 128 instead of onboard device 104 may detect that tampering has occurred based on determining that a vehicle 102 should be disabled and receiving data indicating that a start sequence of vehicle 102 has been detected. Alternatively, the operations center 128 may detect that tampering has occurred based on receiving data indicating that movement of vehicle 102 has occurred following a detected start sequence of vehicle 102.

Operations center 128 may be owned or controlled by a legal entity operating operations center 128, and may be referred to as an "operations center entity." The operations center 128 itself may be a stand-alone computer system, a group of stand-alone computer systems, a group of rack-mounted computer systems, or the computer functionality of the operations center 128 may be implemented within a cloud computing environment. In the case of "cloud computing" the precise physical location and capability of the operations center 128 may change daily based on the amount of computer resources needed at any given time. Operations center 128 may communicate with onboard device 104 regarding various functions and aspects of vehicle 102.

The various components of onboard device 104 may be contained in exterior case 138. Exterior case 138 may be constructed from any material, such as plastic, that retains its shape after molding such that the exterior case 138 defines an interior volume with the processor 106, memory 108, A/D converter 110, cellular transceiver 120, DO converter 114, and GPS receiver 122 disposed within the interior volume.

In an example system that performs only location services and tow detection, only two wires (e.g., pair of wires 132) will protrude through the exterior case 138. That is, the lot management functions which the example devices enable (e.g., locating vehicles on or off the lot of the dealership) as well as tow detection (e.g., detecting movement of the vehicle in the absence of a start sequence of the internal combustion engine of the vehicle) can be performed by a device having only two wires protruding therefrom.

In example systems where the onboard device performs location services, tow detection, and has the ability to disable the vehicle on command from the operations center 128, only three wires will protrude through the exterior case 138—one wire 132a coupled to the positive terminal of the main battery 112, one wire 132b coupled to a reference voltage (e.g., negative terminal 204 of the main battery 112), and a third wire coupled to a coil of a relay external to the onboard device 104. As such, lot management functions which the example device enables (e.g., disabling or enabling a vehicle on or off the lot that has been stolen or moved without permission from the owner of the vehicle or the dealership prior to the vehicle being sold) can be performed by a device having three wires protruding therefrom.

Figure 2:
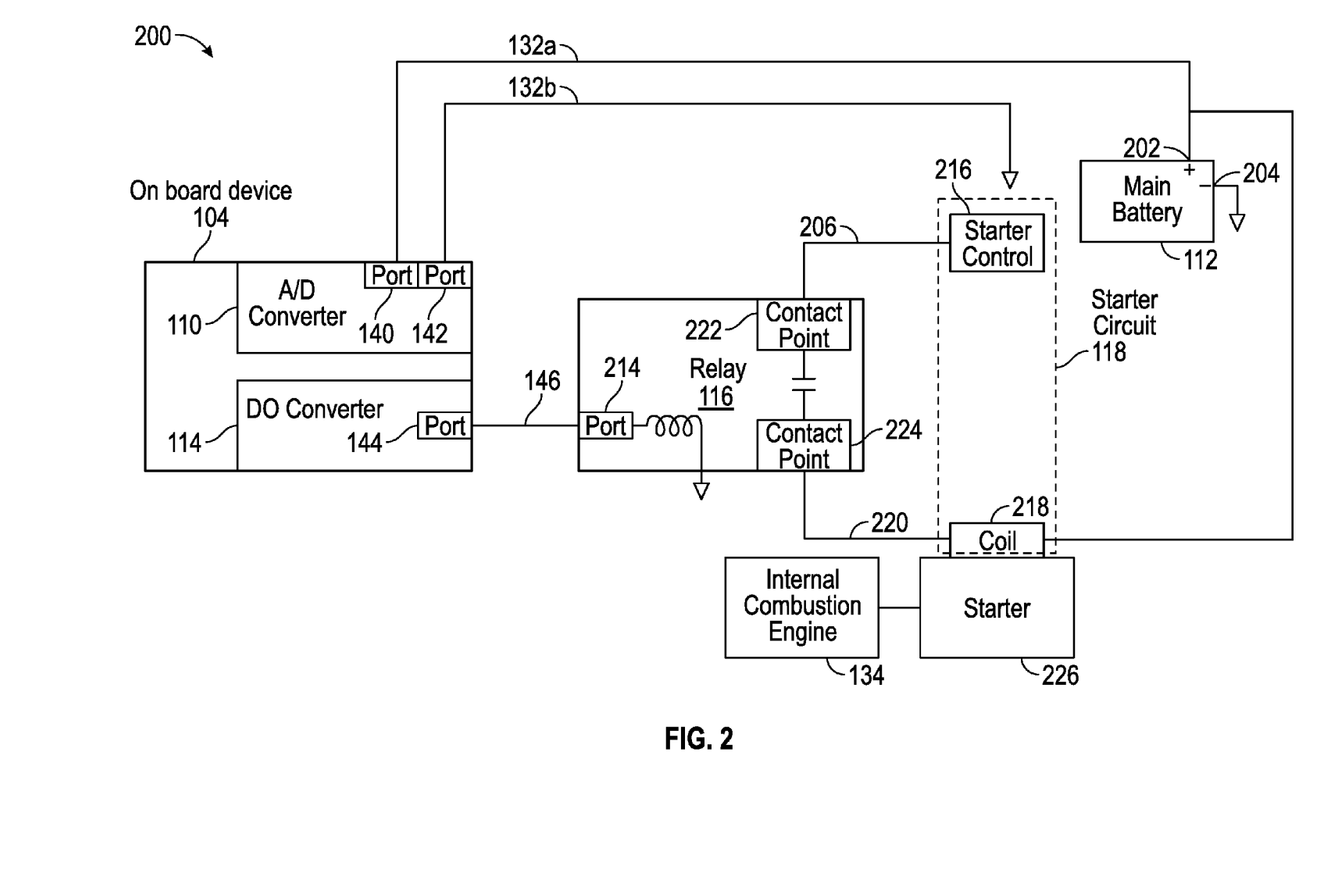
FIG. 2 shows an electrical block diagram of a system comprising an onboard device in accordance with at least some embodiments.

FIG. 2 shows an electrical block diagram 200 depicting an example onboard device 104 coupled with vehicle 102 in the situation where the onboard device 104 can disable the vehicle 102. In particular, electrical block diagram 200 shows further details of onboard device 104, relay 116, and starter circuit 118. As discussed above, onboard device 102 and relay 116 may be present in any suitable location within vehicle 102 such as under or within the dashboard, in an electrical compartment under the hood, or within the luggage compartment of vehicle 102.

Main battery 112 of vehicle 102 may be present in the engine of vehicle 102, the trunk of vehicle 102, or in any other suitable location within vehicle 102. Main battery 112 comprises a positive terminal 202 coupled to analog input port 140 of A/D converter 110 of onboard device 104 by way of wire 132a. As discussed above, A/D converter 110 may be used to monitor voltage levels of main battery 112. Positive terminal 202 of the main battery 112 is also coupled to coil 218 associated with the starter 226. Coil 218, which may be located in an engine compartment of vehicle 102, also has a control wire 220 that couples to contact point 224 of relay 116. Starter control 216 couples to contact point 222 of relay 116 by way of wire 206. It will be appreciated that wires 206 and 220, prior to installation of the onboard device 104 and relay 116, are a single (possibly contiguous) wire previously described as the vehicle's ignition wire.

Starter circuit 118 is comprised of starter control 216, wires 206 and 220, and coil 218. Starter circuit 118 is coupled to internal combustion engine 134 of vehicle 102. The internal combustion engine 134 may be cranked initially after the starter circuit 118 engages starter 226. That is, the starter control 216 provides a control signal to coil 218, and coil 218, in turn, electrically couples the starter 226 to positive terminal 202 of the main battery 112.

It will be further appreciated that after installation, relay 116 is coupled within the defined starter circuit 118 by cutting the ignition wire, and coupling wire 206 to contact point 222 and wire 220 to contact point 224. Installation of relay 116 enables a disabling or enabling of vehicle 102 as relay 116 may control coupling of wires 206 and 220, where without a coupling of wires 206 and 220 an internal combustion engine 134 may not be cranked. As can be appreciated from the description and drawings, "disabling" of the vehicle in the example system only affects the ability to crank the engine for starting, and does not, for example, turn off an already running internal combustion engine.

With respect to disabling, where onboard device 104 receives a message to disable vehicle 102, onboard device 104 may disable vehicle 102 by asserting digital output port 144. Onboard device 104 is coupled to relay 116 by way of wire 146, coupling digital output port 144 of onboard device 104 and coil input port 214 of relay 116. As described in FIG. 1, digital out port 210 may be part of DO converter 114. In the example of disabling vehicle 102, DO converter 114 may send a disable signal to coil input port 214 by asserting digital output port 144.

In one example system, when the signal from the digital out port 144, coupled to the coil input port 214, is asserted, the set of contact points 222 and 224 electrically decouple the starter control 216 from the coil 218 and starter 226. That is, when the signal to the coil input port 214 is asserted, a signal from starter control 216 does not reach coil 218. In turn, without a signal at coil 218 that closes contacts to starter 226, the starter 226 will not operate, and an internal combustion engine 134 will not start.

In various embodiments, the relay 116 may be implemented with any mechanism that implements the functions of a switch. For example, the relay 116 may be an electrically operated mechanical relay that comprises a coil which conducts electricity when a signal is asserted at coil input port 214. A magnetic field generated by the coil conducting electricity may cause a strip of metal coupling the contact points 222 and 224 to be pulled out of position toward the coil. Thus, the contact points 222 and 224 may be decoupled. In effect the vehicle 102 may be disabled as a signal from a starter control 216 will not reach coil 218. Other examples of mechanisms that may implement the functions of a switch include solid-state relays, transistors, silicon-controlled rectifiers, and the like. Although an example for disabling vehicle 102 has been discussed, onboard device 104 may enable vehicle 102 in a similar manner but by reversing the signal asserted at coil input port 214.

An onboard device 104 may receive a command in the form of a message from an external source such as operations center 128 to disable vehicle 102. For a variety of reasons, operations center 128 may determine to disable or enable vehicle 102. For example, the operations center 128 may track hours that a dealership is open or closed and may disable all the vehicles during hours that a dealership is closed in an effort to reduce chances that a vehicle is stolen off the lot. As another example, an operations center 128 may determine that a vehicle 102 is not present within a certain geo-boundary (e.g., within the dealership lot) and determine to disable the vehicle after confirming that the vehicle 102 should not be outside of the geo-boundary.

Aside from disabling or enabling vehicle 102, onboard device 104 may perform other functions such as send a notification indicating movement of the vehicle 102 without occurrence of a start sequence. In various embodiments, onboard device 104 may monitor for the presence of a start sequence of the internal combustion engine of vehicle 102 by monitoring voltage levels of the main battery 112 by way of signals received at analog input port 206 of A/D converter 110. Voltage levels of the main battery 112 may go through a sequence of voltages during startup of the vehicle 102.

For example, a voltage level of main battery 112 may be at a first voltage level when vehicle 102 is off, a second voltage level indicative of starter 226 drawing power from main battery 112. The voltage level of main battery 112 may be at a third voltage level when the internal combustion engine 134 is running and the alternator is charging main battery 112. Based on detecting a sequence of voltages the onboard device may determine that vehicle 102 has gone through a proper start sequence, and the absence of such a sequence of voltage is indicative of the vehicle 102 has not gone through a proper start sequence. The sensing for a start sequence occurs only on sampling voltage levels of main battery 112, without receiving signals from an ignition wire.

In other embodiments, the onboard device 104 may monitor voltage levels of main battery 112 to determine whether the voltage level is below a certain threshold. The threshold voltage may represent a minimum threshold value of a voltage level (e.g. 14 V) of the main battery 112 while the internal combustion engine 134 of a vehicle 102 is running and the main battery 112 is charging. Based on detecting that the voltage level is below the minimum threshold value of a voltage level (e.g., 14 V), the onboard device 104 may determine that vehicle 102 is not running. Other minimum threshold values may be determined based on operating characteristics of vehicle 102.

Along with a determination that a vehicle 102 has not gone through a start sequence or the vehicle 102 is not running, if the onboard device 104 detects motion of vehicle 102, onboard device 104 may send a notification indicative of motion of vehicle 102 in the absence of a start sequence or upon determining that a vehicle is not running. Onboard device 104 makes such a determination without a connection to an ignition wire that transmits an indication of the state of the internal combustion engine by way of a Boolean signal. An example start sequence is discussed next in FIG. 3.

Figure 3:
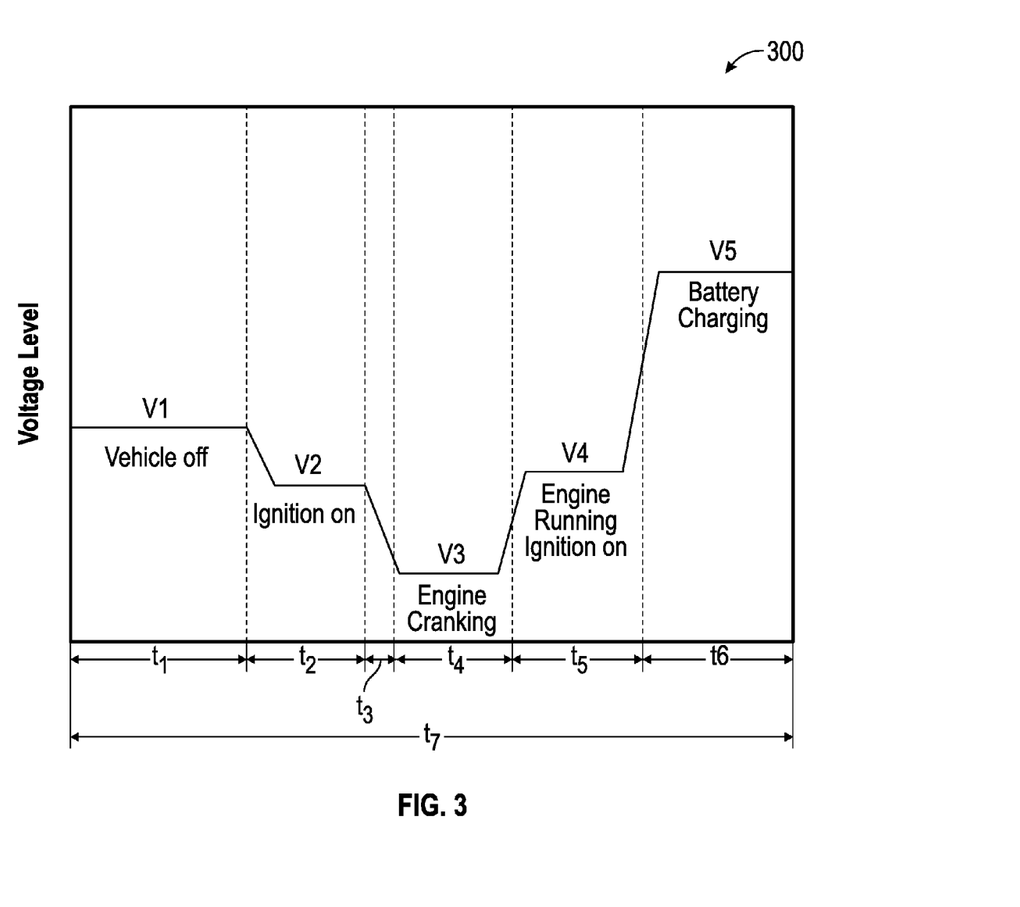
FIG. 3 shows a plot of voltage levels of a main battery of a vehicle in accordance with at least some embodiments.

Turning now to FIG. 3, a plot 300 of voltage levels of a main battery of a vehicle in accordance with at least some embodiments is shown. During a time t1, a vehicle, such as vehicle 102, is off. That is, an internal combustion engine of vehicle 102 is not running. The voltage level v1 may drift with time based on the time between when the main battery is charged and age of the main battery. Time interval t1 may be arbitrary as t1 represents a duration of time during which a vehicle is turned off. In most cases, main battery voltage during interval t1 is about 12 volts.

At time t2, a start sequence for vehicle 102 begins when the ignition switch is activated (e.g., key turn, button pushed). The interval t2 may be fairly brief in comparison to interval t1, and during t2 main battery 112 provides current to various computer systems and accessories of the vehicle but the starter 226 has not yet engaged. Thus a voltage level v2 drops below voltage level v1. The t2 interval may depend on how long a vehicle operator keeps the ignition switch in the accessories position and how the vehicle electrical system has been configured. In some cases, the main battery voltage during interval t2 is about 11 volts, but again such depends on the age of the main battery, the amount of current drawn by the vehicle in the particle state, and the length of time since the last charge of the main battery.

Once the starter 226 has engaged, there is an even further drop in the voltage level of the main battery 112 from v2 to v3. During a time t4, the starter 226 cranks the internal combustion engine 134. During time t4, the main battery 112 provides significant cranking amperage to the starter 226, and thus the voltage v3 is the lowest in the example sequence, and may be on the order of four to eight volts.

At the transition between time t4 and time t5, the internal combustion engine 134 starts running and the starter 226 disengages. As less power is drawn from main battery 112 by the starter 226, a voltage level of main battery 112 again rises above voltage level v3 to reach voltage level v4. During the example time t5, the internal combustion engine 134 is running but the alternator has yet to begin charging the main battery. The interval t5 may be relatively short, as the alternator begins charging the main battery soon after the internal combustion engine 134 begins running.

During time t6, a voltage level v5 is higher than any other voltage level of main battery 112. During time t6, the internal combustion engine 134 is running and the alternator is charging the main battery 112. In most cases, the main battery voltage during the interval t6 is about 14 volts. Overall, the various time intervals represented by t7 may represent all or portions of a start sequence that an onboard device 104 monitors for.

Upon an occurrence of a start sequence, onboard device 104 may determine that a vehicle 102 is running after having undergone a proper startup. In various embodiments, the onboard device 104 may monitor for a voltage level equal to or above voltage level v5 (e.g., 14 volts or more) to determine that an internal combustion engine 134 is running. Alternatively, the onboard device 104 may monitor for a voltage level under voltage level v5 to determine that an internal combustion engine 134 is not running, and in turn that a vehicle 102 is not running.

In various embodiments, an onboard device 104 may monitor for a sequence of voltages as described with regards to FIG. 3 to determine whether a proper start sequence has occurred. For instance, a program stored on onboard device 104 may cause processor 106 to correlate analog voltage detected on pair of wires 132 over time to the predetermined sequence of voltages (plot 300). Based on the correlation (i.e., the detected voltage levels of main battery 112 over time correlate to those discussed in plot 300), the onboard device 104 may determine presence of the start sequence. In some instances, an operations center 128 may determine whether a proper start sequence has occurred based on data received from onboard device 104, corresponding to detected voltage levels of main battery 112 over time.

Figure 4:
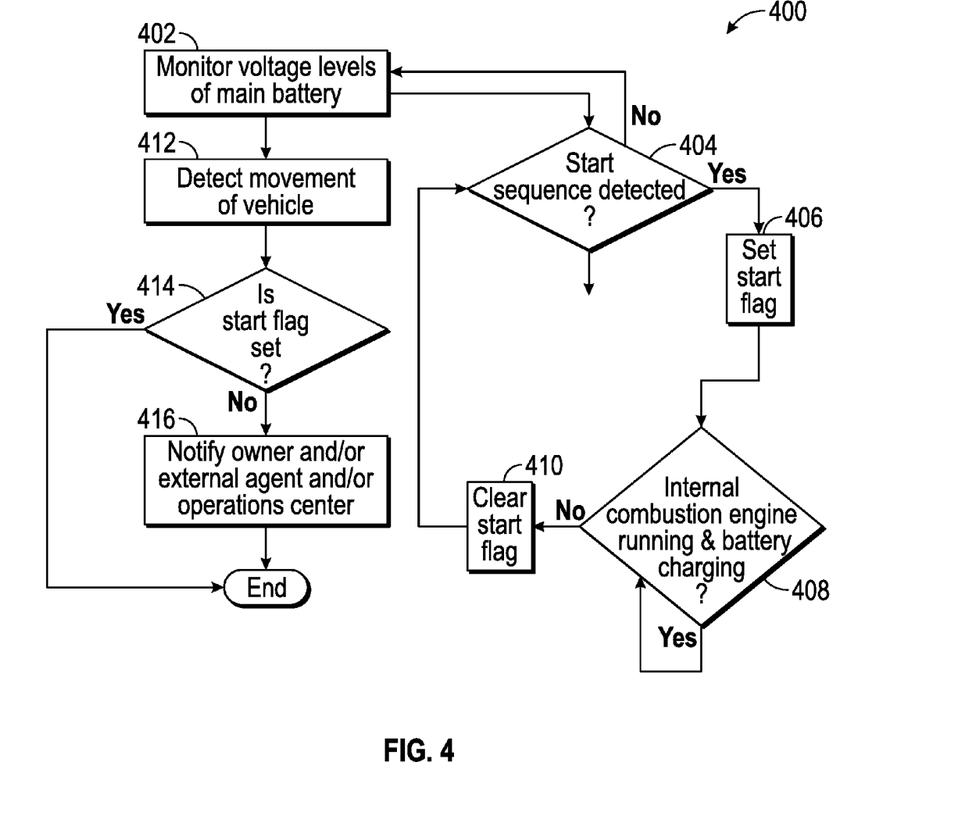
FIG. 4 shows a method in accordance with at least some embodiments.

Turning now to FIG. 4, an example method in accordance with at least some embodiments for detecting movement of a vehicle when an internal combustion engine of the vehicle is not running is shown. The method utilizes an onboard device, such as onboard device 104 as discussed above. In various embodiments, some of the blocks shown in FIG. 4 may be performed concurrently, in a different order than shown, or omitted. Additional method element may be performed as desired.

Initially, an onboard device may monitor voltage levels of a battery such as main battery 112 (block 402). Based on the received voltage levels, the onboard device may monitor for changes in voltage of a main battery indicative of a start sequence of an internal combustion engine of a vehicle (block 404). That is, the onboard device may contain a program that when executed causes a processor of the onboard device to monitor for the presence of a start sequence on an internal combustion engine of the vehicle. An onboard device may monitor for the presence of the start sequence by correlating analog voltage on a pair of wires over time to a predetermined sequence of voltages, and based on the correlation determine presence of the start sequence. For instance, onboard device may correlate detected analog voltage on the pair of wires over time to the sequence discussed in FIG. 3.

To track whether a start sequence has been detected, the onboard device may set a start flag once a start sequence is detected (block 406). While the internal combustion engine is running, the start flag remains set (block 408). The setting of the start flag avoids the situation where an onboard device may detect movement of the vehicle but a start sequence has not occurred for several hours, for example, when a car has been started and has been running for several hours.

Alternatively, in various embodiments, the onboard device may monitor for elevated voltage levels of the main battery indicative of a charging of the main battery and an internal combustion engine that is running. When the internal combustion engine is no longer running and the main battery is no longer charging, the start flag is cleared (block 410). For example, the onboard device may determine that voltage levels of the main battery have dropped below a certain threshold that is associated with the internal combustion engine running and the battery charging.

At block 412, the onboard device may detect movement of the vehicle. As discussed previously, the onboard device may receive location data, for example, in the form of signals received from GPS satellites. In some embodiments, the onboard device may analyze the received signals to create location data that is indicative of the current location of the vehicle.

The onboard device may then determine whether the start flag is set (block 414). Upon a determination that the flag is not set, the onboard device sends a message to an operations center, third party, or owner indicating movement of the vehicle in the absence of the start sequence of the internal combustion engine (block 416). Otherwise, if the start flag is set, the method ends without the onboard device sending such a message.

Figure 5:
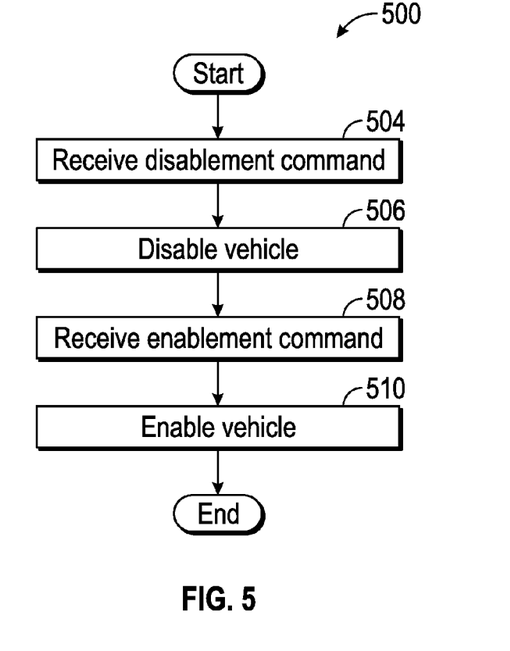
FIG. 5 shows a method in accordance with at least some embodiments.

Turning now to FIG. 5, an example method in accordance with at least some embodiments for disabling and enabling a vehicle is shown. The method 500 starts at block 504 where an onboard device receives a disablement command. This command may be received from an operations center monitoring various aspects associated with the vehicle. For example, as discussed above, the operations center may be in charge of managing a lot containing vehicles for a dealership. Based on determining that various conditions have been met, such as a dealership is closed for business, the operations center may send the command to disable the vehicle. The operations center may also determine to disable the vehicle after a determination that the vehicle is outside of a designated geo-boundary.

At block 506, the onboard device disables the vehicle. As discussed above, the onboard device may be configured to disable the vehicle by way of a relay wired into the starter circuit of a vehicle. At block 508, the onboard device may receive an enablement command. This command may be received from an operations center, for example, based on determining that various conditions have been met, such as a dealership is open for business. At block 510, the onboard device enables the vehicle. The onboard device my enable the vehicle by way of the relay wired into the starter circuit of the vehicle.

Figure 6:
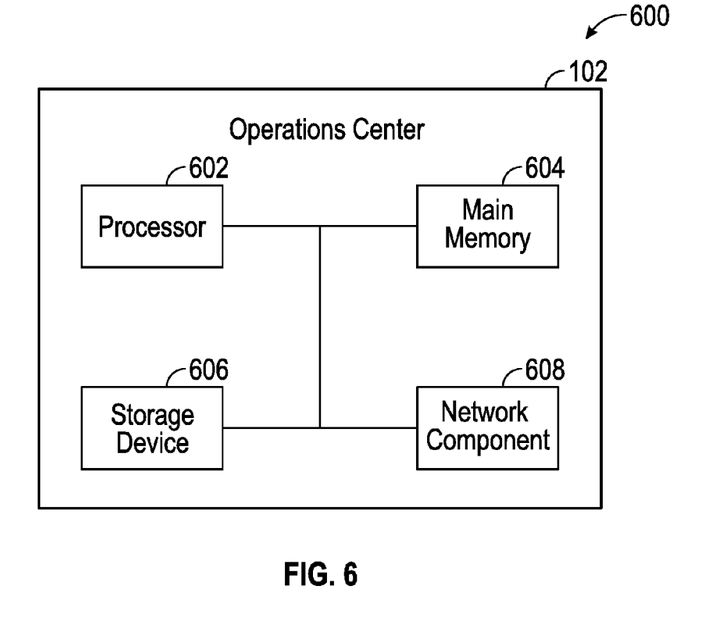
FIG. 6 shows, in block diagram form, a computer system in accordance with at least some embodiments.

Turning now to FIG. 6, a computer system in accordance with at least some embodiments is shown. In various embodiments, the computer system may be representative of computer systems comprising the operations center 128 discussed above. The computer system 600 comprises a processor 602, main memory 604 coupled to processor 602, storage device 606 and network component 608.

The processor 602 may include a hardware processing unit, such as a central processing unit, a graphics processing unit, or both. Additionally, the processor 602 may include a local memory that may store program modules, and/or program data. In an illustrative implementation, the processor 602 may include a cache memory and one or more registers as well as digital electronic circuits such as an arithmetic logic unit (ALU) and a control unit.

Programs executable by the processor 602 may be stored on the storage device 606 (e.g., a hard drive, solid state disk, memory stick, optical disc), and accessed when needed by the processor 602. The program stored on the storage device 606 may comprises programs to implement various processes on the computer system 600. In some cases, the programs are copied from the storage device 606 to the main memory 604, and the programs are executed from the main memory 604. Both the main memory 604 and storage device 606 shall be considered non-transitory computer-readable storage media.

Additionally, computer system 600 may comprise network component 608. The network component 608 enables the computer system 600 to communicate to an onboard device 104 by way of a wireless network such as wireless network 124. This may be achieved through various methods. For instance, the network component 608 may connect to a wired network, such as a public switched telephone network, that in turn connects to wireless network 124. The network component 608 may enable the computer system 600 to communicate by exchanging discrete data packets or frames over network signal lines such as twisted pair, coaxial, optical fiber, telephone lines, satellites, microwave, relays, modulated AC power lines, infrared wireless, or other conventionally known data transmission systems. In several implementations, the network component 608 may also enable the computer system 600 to communicate directly over wireless network 124 that may be a wireless wide area network.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An onboard device, comprising:
a processor;
a memory storing executable instructions and coupled to the processor;
an analog-to-digital (A/D) converter coupled to the processor;
a transceiver coupled to the processor; and
a global positioning system (GPS) receiver coupled to the processor,
wherein the processor is configured to:
monitor changes in voltage of a main battery indicative of a start sequence of a vehicle;
detect movement of the vehicle based on satellite signals received by the GPS receiver; and
send a message to an operations center remote from the onboard device indicating movement of the vehicle in the absence of the start sequence of the vehicle.

2. The onboard device of claim 1, further comprising a pair of wires, wherein a first wire of the pair of wires is coupled to an analog input port of the A/D converter, wherein a second wire of the pair of wires is coupled to a reference voltage port of the A/D converter, wherein when the processor monitors for presence of the start sequence, the processor correlates analog voltage on the pair of wires over time to a predetermined sequence of voltages, and determines presence of the start sequence based on the correlation.

3. The onboard device of claim 2, wherein the predetermined sequence of voltages corresponds to a sequence of voltage levels of the main battery of the vehicle as the vehicle goes through the start sequence of the vehicle.

4. The onboard device of claim 2, wherein the predetermined sequence of voltages comprises a first voltage level indicative of the vehicle being off, a second voltage level indicative of cranking of an internal combustion engine of the vehicle, and a third level indicative of the main battery charging.

5. The onboard device of claim 2, wherein the predetermined sequence of voltages comprises a first voltage level indicative of the vehicle being off, a second voltage level indicative of the vehicle drawing power from the main battery of the vehicle, and a third level indicative of the vehicle running and the main battery charging.

6. The onboard device of claim 1, further comprising a pair of wires, wherein a first wire of the pair of wires is coupled to an analog input port of the A/D converter, wherein a second wire of the pair of wires is coupled to a reference voltage port of the A/D converter, wherein when the processor monitors for presence of the start sequence, the processor correlates analog voltage on the pair of wires to a threshold voltage, and determines a state of the vehicle based on the correlation.

7. The onboard device of claim 6, wherein the threshold voltage corresponds to a voltage level of the main battery when the vehicle is in a running state.

8. The onboard device of claim 6, further comprising:
a digital output (DO) converter coupled to the processor, the DO converter has a digital output port; and
a third wire coupled to the digital output port,
wherein the processor is further configured to:
receive a command to disable the vehicle, the command received from the operations center over the transceiver; and
assert the digital output port responsive to the command to disable the vehicle.

9. A system comprising:
a vehicle comprising a main battery; and
an onboard device affixed to the vehicle, the onboard device comprising:
a processor;
a memory storing executable instructions and coupled to the processor;
an analog-to-digital (A/D) converter coupled to the processor;
a transceiver coupled to the processor; and
a global positioning system (GPS) receiver coupled to the processor,
wherein the processor is configured to:
monitor changes in voltage of the main battery indicative of a start sequence of a vehicle;
detect movement of the vehicle based on satellite signals received by the GPS receiver; and
send a message to an operations center remote from the onboard device indicating movement of the vehicle in the absence of the start sequence of the vehicle.

10. The system of claim 9, wherein the onboard device further comprising a digital output (DO) converter coupled to the processor, wherein the DO converter has a digital output port, wherein the system further comprises a relay that defines a coil input port and a set of contact ports, the digital output port coupled to the coil input port, and the set of contact ports coupled within a starter circuit of a starter motor associated with the vehicle, and when the coil input port is asserted the set of contact points electrically de-couple the starter circuit from the starter motor, and wherein the processor is further to:
receive a command to disable the vehicle, the command received from the operations center over the transceiver; and
assert the digital output port responsive to the command to disable the vehicle.

11. The system of claim 9, wherein when the processor monitors for the presence of the start sequence, the processor correlates analog voltage over time to a predetermined sequence of voltages, and determines occurrence of the start sequence based on the correlation.

12. The system of claim 11, wherein the predetermined sequence of voltages corresponds to a sequence of voltage levels of the main battery as the vehicle goes through the start sequence of the vehicle.

13. The system of claim 11, wherein the predetermined sequence of voltages comprises a first voltage level indicative of the vehicle being off, a second voltage level indicative of cranking of an internal combustion engine of the vehicle, and a third level indicative of the main battery charging.

14. The system of claim 11, wherein the predetermined sequence of voltages comprises a first voltage level indicative of the vehicle being off, a second level indicative of the vehicle drawing power from the main battery and cranking of an internal combustion engine of the vehicle, and a third level indicative of the internal combustion engine running and the main battery charging.

15. The system of claim 9, wherein when the processor monitors for the presence of the start sequence, the processor correlates analog voltage to a threshold voltage, and determines a state of the vehicle based on the correlation.

16. The system of claim 15, wherein the threshold voltage corresponds to a voltage level of the main battery when the vehicle is in a running state.

17. A method comprising:
monitoring, by an onboard device, changes in voltage of a main battery indicative of a start sequence of a vehicle;
detecting, by the onboard device, movement of the vehicle based on satellite signals received by a GPS receiver; and
sending, by the onboard device, a message to an operations center remote from the onboard device indicating movement of the vehicle in the absence of the start sequence of the vehicle.

18. The method of claim 17, wherein monitoring changes in voltage of the main battery further comprises:
correlating, by the onboard device, the changes in voltage over time to a predetermined sequence of voltages, wherein the predetermined sequence of voltages corresponds to a sequence of voltage levels of the main battery as the vehicle goes through a startup sequence; and
determining occurrence of the start sequence based on correlating the voltage.

19. The method of claim 17, wherein monitoring changes in voltage of the main battery further comprises:
correlating the voltage detected by the onboard device to a threshold voltage, wherein the threshold voltage corresponds to a voltage level of the main battery of the vehicle in a running state; and
determining a state of the vehicle based on the correlating the voltage.

20. The method of claim 17, further comprising:
receiving, by the onboard device, a command to disable the vehicle from the operations center; and
disabling the vehicle in response to receiving the command to disable the vehicle.

* * * * *